US008609756B2

(12) United States Patent
Baert et al.

(10) Patent No.: US 8,609,756 B2
(45) Date of Patent: Dec. 17, 2013

(54) POLYMERIC COMPOSITION BASED ON A PVDF HOMOPOLYMER AND A THERMOPLASTIC FLUOROCOPOLYMER

(75) Inventors: Thierry Baert, Watermael Boitsfort (BE); Bernard Goffaux, Les Bons Villers (BE); Vincent Bodart, Namur (BE); Stephane Heuschling, Brussels (BE)

(73) Assignee: Solvay (Societe Anonyme), Brussels (BE)

( * ) Notice: Subject to any disclaimer, the term of this patent is extended or adjusted under 35 U.S.C. 154(b) by 804 days.

(21) Appl. No.: 11/577,597

(22) PCT Filed: Oct. 20, 2005

(86) PCT No.: PCT/EP2005/055436
§ 371 (c)(1),
(2), (4) Date: Apr. 20, 2007

(87) PCT Pub. No.: WO2006/045753
PCT Pub. Date: May 4, 2006

(65) Prior Publication Data
US 2009/0124748 A1 May 14, 2009

(30) Foreign Application Priority Data
Oct. 21, 2004 (FR) .................................... 0411233

(51) Int. Cl.
*C08K 5/11* (2006.01)
*C08L 27/16* (2006.01)
(52) U.S. Cl.
USPC ........... 524/314; 524/520; 524/544; 524/545; 524/546; 525/199

(58) Field of Classification Search
USPC ............................ 524/520, 314, 544; 525/199
See application file for complete search history.

(56) References Cited

U.S. PATENT DOCUMENTS

| 4,302,556 | A | * | 11/1981 | Endo et al. | 525/199 |
|---|---|---|---|---|---|
| 4,423,192 | A | * | 12/1983 | Van Lang et al. | 525/199 |
| 5,006,602 | A | * | 4/1991 | Guerin et al. | 525/72 |
| 5,429,849 | A | * | 7/1995 | Lasson et al. | 428/36.9 |
| 6,054,538 | A | * | 4/2000 | Thulliez et al. | 525/199 |
| 6,271,294 | B1 | * | 8/2001 | Lasson et al. | 524/314 |
| 6,306,971 | B1 | | 10/2001 | Betremieux et al. | |
| 6,376,586 | B1 | * | 4/2002 | Pascal et al. | 524/225 |
| 6,512,032 | B1 | * | 1/2003 | Ohira et al. | 524/128 |
| 2005/0027076 | A1 | * | 2/2005 | Mizuno et al. | 525/199 |

FOREIGN PATENT DOCUMENTS

| EP | 0 608 939 | | 8/1994 |
|---|---|---|---|
| EP | 0 608 940 | | 8/1994 |
| JP | 2003119335 A | * | 4/2003 |
| WO | 96/26980 | | 9/1996 |

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

Polymeric composition based on a PVDF homopolymer and a thermoplastic fluorocopolymer Polymeric composition based on a PVDF homopolymer and a thermoplastic fluoropolymer offering an improved toughness/processability compromise, possessing an apparent melt viscosity not exceeding 60 000 Pa·s at a shear rate of 1 $s^{-1}$, a ductile-brittle transition temperature below +5° C. and a weight loss in air at 150° C. of 5% or less. Pipes and fashioned articles prepared from this composition.

31 Claims, 1 Drawing Sheet

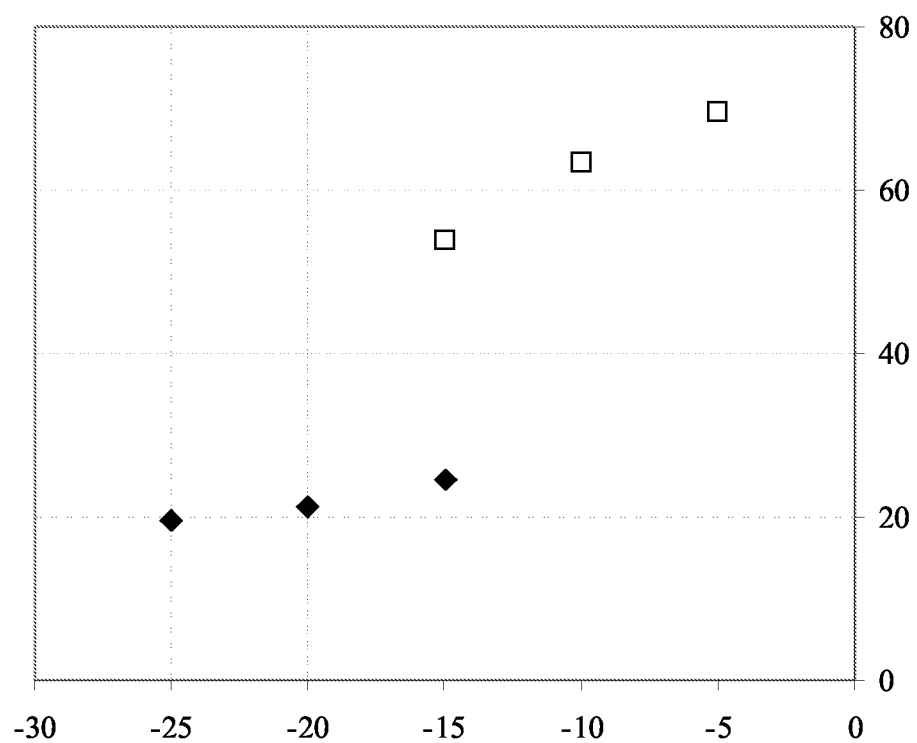

POLYMERIC COMPOSITION BASED ON A PVDF HOMOPOLYMER AND A THERMOPLASTIC FLUOROCOPOLYMER

This application is a 371 of PCT/EP05/55436 filed Oct. 20, 2005.

The present invention relates to a particular polymeric composition based on fluoropolymers for producing pipes or other articles capable of withstanding extremely harsh operating conditions, such as those encountered in the offshore oil industry. The invention also relates to the pipes and other articles fashioned from this composition.

The exploitation of offshore oil deposits subjects the materials employed, and in particular the pipes used for transporting the hydrocarbons thus extracted, to extreme conditions. This is because the hydrocarbons are generally transported at high temperature (around 135° C.) and at high pressure (for example 700 bar). During operation of the installations, acute problems regarding the mechanical, thermal and chemical resistance of the materials therefore arise. To these must be added other requirements, before or after service: thus, when the pipes are being laid or lifted (unwound or wound), they may suffer impacts, which they must withstand, at very low temperatures (for example −35° C.), and substantial deformation. A deformability of at least 7% is considered as necessary in order to (un)wind the pipes without damaging them. Finally, it is important for the properties of the pipes to remain almost constant over the course of time, so as to ensure that they have a long lifetime and that there is a possibility of reusing them.

In an endeavour to meet all these requirements, both in the short term and in the long term, various types of pipes have already been proposed, these generally comprising one or more metallic elements providing mechanical strength, for example a spiralled steel tape, and also various layers based on polymeric compositions, in particular for sealing and heat shielding purposes. These polymeric compositions may for example be based on polyethylene, but this choice limits the operating temperature of the pipes to below 100° C. They may also be based on fluoropolymers, such as PVDF (polyvinylidene fluoride), which raises their maximum operating temperature and gives them excellent chemical resistance.

However, the compositions, especially based on semicrystalline PVDF, are often plasticized in order to make up for a lack of flexibility, a low yield point and insufficient toughness. This has the drawback that the plasticizers are extracted quite rapidly by the hydrocarbons being transported, leading to a progressive loss of the properties provided by the plasticization (flexibility, toughness, etc.)

Finally, additional requirements arise when envisaging the manufacture of the pipes in question. Thus, it is obviously desirable for the processability of the polymeric compositions to be as good as possible, and for them therefore to have a moderate viscosity. However, in the case of pipes that include a spiralled steel tape, it is desirable for the production of a polymeric coating in contact with the spiralled tape not to be overly disturbed by the presence of gaps between the turns. This is because, during manufacture of the pipes, resin may be forced into these gaps (resin "sag"), giving rise to inhomogeneities and therefore potential fracture initiators. In this case, it is preferable for the composition used not to have too low a viscosity.

To solve some of these problems, Patent Application EP 608 940 proposes replacing the optionally plasticized fluoropolymers with polymeric compositions comprising a PVDF homopolymer and a thermoplastic copolymer of vinylidene fluoride (VF2) and with at least one other fluoromonomer. Patent Application EP 608 939 discloses the addition of a plasticizer to the abovementioned polymeric compositions in proportions of between 5 and 20% by weight relative to the total weight of the polymeric constituents. However, these compounds have a limited toughness at low temperature and the optional plasticizer is extracted upon contact with certain chemicals. Plasticizer extraction results in a progressive loss of the properties provided by the plasticization (flexibility, toughness), consequently limiting the lifetime of the articles based on these compositions.

Now, it has been discovered that the composition according to the invention makes it possible to benefit from the advantages of the presence of polymers of higher molecular weight in terms of impact properties, without being penalized by a loss of processability—the composition according to the invention can therefore be processed in standard equipment and under standard conditions (extrusion, coextrusion, etc.)

The object of the present invention is therefore to provide a polymeric composition with improved mechanical properties at low and high temperatures, which is easy to process and which maintains, over the course of its use, sufficient flexibility and toughness over a wide operating temperature range.

In this case, the present invention relates to a polymeric composition based on a PVDF homopolymer and a thermoplastic fluorocopolymer offering an improved toughness/processability compromise, possessing an apparent melt viscosity not exceeding 60 000 Pa·s at a shear rate of $1\ s^{-1}$, a ductile-brittle transition temperature below +5° C. and a weight loss in air at 150° C. of 5% or less.

The expression "apparent melt viscosity" is understood to mean, for the purposes of the present invention, the apparent viscosity ($\eta$, expressed in Pa·s) measured at 230° C. on a capillary rheometer fitted with a die having an L/r ratio of 40 (diameter: 1 mm; length: 20 mm), at a shear rate of $1\ s^{-1}$.

The term "ductile-brittle transition temperature" is understood to mean, for the purposes of the present invention, the temperature ($T_{db}$) of the transition between the ductile failure mode and the brittle failure mode of the polymeric compositions measured on Charpy notched impact according to the ISO 179 1Ea standard.

The expression "weight loss in air at 150° C." is understood to mean the weight change of an extruded specimen 4 mm in thickness and 10 g in initial weight that has been held for one month at 150° C. in air.

More precisely, the polymeric composition of the invention possesses an apparent melt viscosity of 60 000 Pa·s or less, preferably 55 000 Pa·s or less and more preferably 50 000 Pa·s or less, at a shear rate of $1\ s^{-1}$.

Advantageously, the polymeric composition of the invention possesses an apparent melt viscosity of 18 000 Pa·s or more and preferably 20 000 Pa·s or more, at a shear rate of $1\ s^{-1}$.

More precisely, the polymeric composition of the invention possesses a weight loss in air at 150° C. of 5% or less, preferably 4.5% or less, more preferably 4% or less and even more particularly preferably 3% or less.

Furthermore, the polymeric composition of the invention possesses a ductile-brittle transition temperature below +5° C. and preferably 0° C. or below.

Advantageously, the polymeric composition of the invention possesses a ductile-brittle transition temperature of −40° C. or higher, preferably −35° C. or higher and more preferably −30° C. or higher.

When the polymeric composition possesses a ductile-brittle transition temperature of +5° C. or higher, the toughness and the impact strength at low temperature are insufficient and there is a risk of brittle fracture.

When the polymeric composition possesses a weight loss in air at 150° C. of 5% or more, its stability is compromised. This results in a progressive loss of the properties provided by the plasticization (flexibility, toughness, etc.) and is in general accompanied by shrinkage effects, which consequently limits the lifetime of the articles based on this composition.

When the polymeric composition possesses an apparent melt viscosity of more than 60 000 Pa·s it becomes difficult to extrude or coextrude these materials using standard techniques and installations. It therefore becomes difficult to process the materials.

The polymeric composition of the invention preferably comprises:
(A) at least one PVDF homopolymer;
(B) at least one thermoplastic copolymer of VF2 and at least one other fluoromonomer; and
(C) at least one third component selected from plasticizers in an amount of less than 5% by weight relative to the total weight of (A) and (B), perfluorinated polymers, low-molecular-weight VF2 polymers and combinations thereof,
the blend of (A) and (B), in the absence of (C), possessing an average intrinsic viscosity $[\eta]_{blend}$ of less than 2.0 dl/g.

The expression "average intrinsic viscosity $[\eta]_{blend}$" is understood to mean, for the purposes of the present invention, the weight average of the intrinsic viscosity of (A) and of the intrinsic viscosity of (B) [the viscosities being measured in N,N-dimethylformamide (DMF) stabilized with 0.1M LiBr at 25° C. with a concentration of 4.0 g/l, using a type B Ubbelohde viscometer] according to the following equation:

$$[\eta]_{blend} = \sum_i x_{Ai}[\eta]_{Ai} + \sum_j x_{Bj}[\eta]_{Bj}$$

where $x_{Ai}$ is the weight fraction of the homopolymer component $A_i$ having an intrinsic viscosity $[\eta]_{Ai}$ and $x_{Bj}$ is the weight fraction of the copolymer component Bj having an intrinsic viscosity $[\eta]_{Bj}$.

Advantageously, the average intrinsic viscosity $[\eta]_{blend}$ of the (A)/(B) blend according to the invention is less than 2.0 dl/g and more preferably 1.95 dl/g or less.

Advantageously, the average intrinsic viscosity $[\eta]_{blend}$ of the (A)/(B) blend according to the invention is equal to 1.20 dl/g or higher, preferably 1.3 dl/g or higher and more preferably 1.4 dl/g or higher.

The expression "at least one PVDF homopolymer" (A) is understood to mean a high-crystallinity VF2 homopolymer or a blend of such VF2 homopolymers.

Advantageously, the weight fraction of (A) is between 45 and 80% by weight relative to the total weight of (A) and (B).

Advantageously, (A) is present in the composition according to the invention in proportions of at least 45%, preferably at least 50% and more preferably at least 55% by weight relative to the total weight of (A) and (B).

Advantageously, the weight fraction of (A) does not exceed 80%, preferably does not exceed 75% and more preferably does not exceed 70% by weight relative to the total weight of (A) and (B).

The PVDF homopolymers according to the invention advantageously possess an intrinsic viscosity $[\eta]$ of at least 1.00 dl/g and not exceeding 2.40 dl/g when measured at a 4.0 g/l concentration in solution in N,N-dimethylformamide stabilized with 0.1M LiBr and at a temperature of 25° C.

PVDF homopolymers possessing an intrinsic viscosity $[\eta]$ of at least 1.20 dl/g but not exceeding 2.30 dl/g are preferred.

PVDF homopolymers possessing an intrinsic viscosity $[\eta]$ of at least 1.40 dl/g but not exceeding 2.20 dl/g are particularly preferred.

The PVDF homopolymers according to the invention advantageously possess a melt flow index (MFI) measured according to the ASTM D 1238 standard at 230° C. under a load of 5 kg not exceeding 15 g/10 min.

PVDF homopolymers possessing a melt flow index not exceeding 3 g/10 min are preferred. PVDF homopolymers having a melt flow index not exceeding 1.5 g/10 min are particularly preferred.

Advantageously, the PVDF homopolymers according to the invention have defects, that is to say "head-to-head" or "tail-to-tail" inversions in the chain of vinylidene fluoride units, but not exceeding 6% when measured by $^{19}$F-NMR. Preferably, the PVDF homopolymers according to the invention have a degree of inversion not exceeding 5%, more preferably not exceeding 4.5%.

These homopolymers may advantageously be obtained by radical polymerization using specific initiators such as TAPPI (tert-amyl pivalate).

Component (B) of the composition according to the invention is advantageously a thermoplastic copolymer of VF2 and at least one other fluoromonomer. This other monomer is advantageously present in this copolymer in proportions by weight of at least 5%, preferably at least 8%. This other monomer is advantageously present in this copolymer in proportions by weight not exceeding 25%, preferably 20% and particularly preferably 16%. Fluorocomonomers giving good results are HFP (hexafluoropropylene), CTFE (chlorotrifluoro-ethylene) and TrFE (trifluoroethylene).

The copolymer (B) according to the invention is advantageously a thermoplastic copolymer (that is to say, at least within the present context, a semicrystalline copolymer) and not an elastomeric copolymer. The term "elastomeric copolymer" is understood to mean, for the purposes of the present invention, polymers serving as base constituent for obtaining true elastomers as defined by the ASTM standard, Special Technical Bulletin No. 184, which characterizes them as materials capable of being drawn, at room temperature, by up to twice their intrinsic length and which, once released after holding them under tension for 5 minutes, resume their initial length, to within 10%, in the same time.

Advantageously, the weight fraction of (B) in the composition according to the invention is between 20 and 55% by weight relative to the total weight of (A) and (B).

Advantageously, the weight fraction of (B) in the composition according to the invention is at least 20%, preferably at least 25% and more preferably at least 30% by weight and relative to the total weight of (A) and (B).

Advantageously, the weight fraction of (B) in the composition according to the invention does not exceed 55%, preferably does not exceed 50% and more preferably does not exceed 45% by weight relative to the total weight of (A) and (B).

The compositions according to the invention advantageously include a third component (C) selected from plasticizers in an amount of less than 5% by weight relative to the total weight of (A) and (B), perfluorinated polymers, low-molecular-weight VF2 polymers and combinations thereof.

The term "plasticizers" is understood to mean, for the purposes of the present invention, the components as defined in *Encyclopedia of Polymer Science and Engineering*, Wiley and Sons (1989), pages 568-569. Monomeric and polymeric plasticizers are preferred. The various classes of polymeric and monomeric plasticizers are also defined in the abovementioned reference (ibid, pages 588-593).

Effective plasticizers are DBS (dibutyl sebacate, having the formula $C_4H_9$—COO—$(CH_2)_8$—COO—$C_4H_9$), DOP (dioctyl phthalate), NBSA (N-n-butylsulphonamide) and polymeric polyesters such as those derived from adipic, azelaic or sebacic acids and from diols, and mixtures thereof, provided however that their molecular weight is advantageously at least about 1500, preferably at least 1800, but advantageously not exceeding about 5000 and preferably not exceeding 2500. This is because polyesters of too high a molecular weight result in compositions of lower impact strength.

One plasticizer that has proved particularly advantageous within the context of the present invention is DBS.

Advantageously, the polymeric composition according to the invention includes from 0 to less than 5% by weight of a plasticizer relative to the total weight of (A) and (B).

The addition to the (A)/(B) blend of an appropriate plasticizer, advantageously in proportions of less than 5%, preferably 4.5% or less, more preferably 4% or less and even more preferably 3% or less by weight, relative to the total weight of (A) and (B), makes it easier to process the polymer blends and subsequently to improve the low-temperature behaviour thereof.

Advantageously, the proportion of plasticizer is 1% by weight or higher and more preferably 2% by weight or higher relative to the total weight of (A) and (B).

A proportion of plasticizer of 2 to 3% by weight relative to the total weight of (A) and (B) gives satisfactory results and a proportion of about 2.5% by weight gives really very satisfactory results.

Plasticizer contents of 5% or higher by weight relative to the total weight of (A) and (B) are to be avoided since they result in more exacerbated extraction effects over time, especially in high-temperature applications. The extraction or leeching-out of the plasticizers results in the progressive loss of the properties provided by the plasticization (flexibility, toughness), consequently limiting the lifetime of the articles initially prepared from the compositions having a plasticizer content of 5% by weight or higher.

The perfluorinated polymers of the invention are preferably TFE (tetrafluoroethylene) homopolymers or copolymers of TFE with other fluoromonomers such as hexafluoropropylene, perfluoroalkyl vinyl ethers or chlorotrifluoroethylene.

Suitable TFE homopolymers or copolymers are notably available as ALGOFLON® PTFE from Solvay Solexis S.p.A.

The perfluorinated polymers of the invention have an average particle size (APS) of advantageously less than 100 µm, preferably less than 20 µm, more preferably less than 15 µm. Excellent results have been obtained with perfluorinated polymers having an APS between 4 and 6 µm.

Should the perfluorinated polymer be a TFE homopolymer, it can be advantageously a non fibrillating PTFE (commonly also referred to as "low molecular weight PTFE" or "low melt viscosity PTFE").

The non fibrillating PTFE has an average molecular weight in number of preferably below 700 000 (as determined by conventional GPC technique).

Besides, the non fibrillating PTFE has preferably an average molecular weight in number of preferably above 50 000 (as determined by conventional GPC technique).

The non fibrillating PTFE has preferably a melt viscosity of below $10^4$ Pa×s, as measured at 372° C. in accordance with the procedure ASTM D1239-52T, modified as described in U.S. Pat. No. 4,380,618.

The non fibrillating PTFE is preferably obtained by irradiation degradation of a high molecular weight homopolymer of tetrafluoroethylene (typically, with an average molecular weight in number above 2 000 000), or directly by polymerization technique such as described in example 1 of U.S. Pat. No. 5,223,343.

The non fibrillating PTFE is usually in the form of finely divided solids, and is then commonly referred to as "PTFE micropowder". The finely divided solids have an average particle size of preferably less than 100 µm, more preferably less than 20 µm, still more preferably less than 10 µm and the most preferably less than 5 µm.

The non fibrillating PTFE has preferably the thermal stability, chemical inertness, lubricity, and high melting temperature similar to high molecular weight PTFEs.

An especially suitable non fibrillating PTFE is POLYMIST® XPH-698 PTFE, available from Solvay Solexis, Inc. Other suitable non fibrillating PTFEs are commercially available notably from DuPont as ZONYL® PTFE (e.g. ZONYL® MP1600 grade), and from Daikin Industries, Ltd. as LUBLON® (e.g. LUBLON® L-5 PTFE).

Advantageously, the polymeric composition according to the invention contains 0 to 10% of a perfluorinated polymer relative to the total weight of (A) and (B).

The addition of an appropriate perfluorinated polymer to the (A)/(B) homopolymer/thermoplastic copolymer blend in proportions not generally exceeding 10% by weight, preferably not exceeding 5% by weight and particularly preferably not exceeding 1% by weight relative to the total weight of (A) and (B) improves the processability of the compound. Advantageously, the proportion of perfluorinated polymer is 0.05% by weight or higher, preferably 0.2% by weight or higher and particularly preferably 0.5% by weight or higher relative to the total weight of (A) and (B).

A proportion of perfluorinated polymer of 0.05 to 10% relative to the total weight of (A) and (B) gives satisfactory results.

A proportion of perfluorinated polymer of 0.5 to 1% by weight relative to the total weight of (A) and (B) gives very satisfactory results.

Advantageously, the polymeric composition according to the invention contains 0 to 35% of a low-molecular-weight VF2 polymer relative to the total weight of (A) and (B).

The addition of a low-molecular-weight VF2 polymer to the homopolymer/thermoplastic copolymer blend [(A)+(B)] in proportions generally not exceeding 35% by weight, preferably not exceeding 30% by weight and particularly preferably not exceeding 25% by weight relative to the total weight of (A) and (B) improves the processability of the compound. Advantageously, the proportion of low-molecular-weight VF2 polymer is 1% by weight or higher, preferably 5% by weight or higher and particularly preferably 10% by weight or higher relative to the total weight of (A) and (B).

A proportion of low-molecular-weight VF2 polymer of 1 to 35% relative to the total weight of (A) and (B) gives satisfactory results.

A proportion of low-molecular-weight VF2 polymer of 10 to 25% by weight relative to the total weight of (A) and (B) gives very satisfactory results.

The expression "low-molecular-weight VF2 polymers" is understood to mean, within the purposes of the present invention, VF2 homopolymers or copolymers of VF2 with at least one other fluoromonomer, having an intrinsic viscosity [η] not exceeding 0.8 dl/g when measured at a concentration of 4.0 g/l in solution in N,N-dimethylformamide stabilized with 0.1M LiBr at a temperature of 25° C.

Preferably the low-molecular-weight VF2 polymers of the invention possess an intrinsic viscosity [η] not exceeding 0.6 dl/g, more preferably not exceeding 0.5 dl/g.

Advantageously, the fluorocomonomers that may be used for preparing the low-molecular-weight VF2 polymers of the invention are HFP (hexafluoropropylene), CTFE (chlorotrifluoroethylene) and TrFE (trifluoroethylene).

Apart from the constituents A, B and C described above, the composition according to the invention may contain (D) various additives and/or fillers and/or electrically conductive particles and/or organic or mineral dyes and/or pigments, which may or may not be macromolecular, well known in the literature.

Non-limiting examples of fillers that may be mentioned include mica, alumina, talc, carbon black, glass fibres, carbon fibres, macromolecular compounds and calcium carbonate.

Non-limiting examples of additives that may be mentioned include UV stabilizers, other than IRGANOX® agents, fire retardants, heat stabilizers, processing aids, other than polyolefins, in particular ethylene polymers.

The composition of the invention may be obtained by any standard technique for preparing polymeric compositions, especially by preblending the various polymers in powder or granule form (optionally also with the other additives or fillers), in the desired proportions, before subjecting them to a thermomechanical processing technique such as extrusion, injection moulding, etc.

This operating method may be applied either for the purpose of manufacturing finished products, such as for example pipes, or, by adding a granulation step thereto, for the purpose of providing granules that contain the desired polymers, additives and fillers in the appropriate proportions, thereby making their subsequent conversion into finished products easier. For the reasons explained above, the composition according to the invention proves to be particularly appropriate for the manufacture, especially by extrusion, of pipes subjected to harsh operating conditions, particularly pipes intended for conveying hot hydrocarbons under pressure, although this represents only one of the potential applications, other articles manufactured from these compositions being just as much the subject of the present invention as pipes.

Thus, the present invention also relates to pipes that comprise at least one layer comprising the composition according to the invention.

The present invention also relates to articles fashioned completely or partly from the composition according to the invention. Preferably, the present invention relates to articles comprising several layers, at least one of which comprises a composition according to the invention. Such multilayer articles may be manufactured by many known techniques, such as coextrusion.

The polymeric composition according to the invention and the articles initially prepared from this composition possess improved mechanical properties at low and high temperatures, can be easily be processed and maintain, over the course of their use, sufficient flexibility and toughness within a wide operating temperature range.

EXAMPLES

The examples described below serve to illustrate the invention, without in any way limiting it.

The melt Theological properties were measured at 230° C. on a capillary rheometer fitted with a die having an L/r ratio of 40 (diameter: 1 mm; length: 20 mm) at shear rates ranging from 1000 to 1 s$^{-1}$. Thus, the apparent melt viscosity (η, expressed in kPa·s) was determined as the value of the apparent viscosity at a shear rate of 1 s$^{-1}$.

4 mm thick strips intended for evaluating the mechanical properties, the 150° C. weight loss and the Charpy impact toughness were extruded on a Brabender PlastiCorder 30 mm single-screw extruder fitted with a 5×25 mm die.

The ductile-brittle transition temperature ($T_{db}$, expressed in ° C.) of the polymeric compositions was measured in Charpy impact mode on notched test pieces according to the ISO 179 1eA standard. The test pieces (dimensions: 80×10×4 mm) were machined from the abovementioned extruded strips and notched according to the ISO 2818 standard. The test pieces were then subjected to Charpy impact measurements according to the ISO 179 1eA standard at increasing temperatures ranging from −35° C. to +25° C. and not differing from one another by more than 5° C. The transition from a brittle fracture mode to a ductile fracture mode was determined on the basis of the fracture surface and the energy level (which suddenly increases at the transition from brittle mode to ductile mode). The ductile-brittle transition temperature was interpolated between the last low temperature exhibiting brittle fracture and the next, higher, temperature, exhibiting ductile fracture. If at a given temperature both fracture modes were encountered, this temperature was taken as the transition temperature $T_{db}$. FIG. 1 shows the data obtained for the composition of Example 8 according to the invention, for which a temperature $T_{db}$ of −15° C. was measured. FIG. 1 is a plot of the toughness (in kj/m$^2$) as a function of the temperature (in ° C.), wherein symbol ♦ denotes a brittle fracture mode and symbol ☐ denotes a ductile fracture mode.

The mechanical properties of the formulations were determined according to the ISO 527 standard at −30° C. Each time the following measurements were made: the modulus E (expressed in MPa) at a pull rate of 1 mm/min, the elongation at the yield point ($E_y$, expressed in %) and the elongation at break ($E_b$, expressed in %) at −30° C. and at a pull rate of 50 mm/min, according to the ASTM D638 standard.

The MFI values were measured according to the ASTM D 1238 standard at 230° C. and under a weight of 10 kg, 5 kg or 2.16 kg.

The 150° C. weight loss in air (Δw) was determined by measuring the weight change of a 4 mm thick extruded specimen of 10 g initial weight which was left for one month at 150° C. in air.

The average intrinsic viscosity [η]$_{blend}$ of the (A)/(B) blend was calculated as the weight average of the intrinsic viscosity values of (A) and (B) measured in 4.0 g/l N,N-dimethylformamide (DMF) stabilized with 0.1M LiBr at 25° C. using a type B Ubbelohde viscometer.

The main characteristics of the PVDF homopolymers and thermoplastic VF2 copolymers used in the examples are given in the following table:

|  |  | MFI at 230° C. (g/10 min) | | | Intrinsic viscosity |
|---|---|---|---|---|---|
|  | Type | 10 kg | 5 kg | 2.16 kg | (dl/g) |
| SOLEF ® 1015 | PVDF homopolymer |  | 0.2 |  | 1.7 |
| SOLEF ® 6003 | PVDF homopolymer |  |  |  | 0.39 |
| SOLEF ® 6012 | PVDF homopolymer | 5 | 1.5 | 0.5 | 1.41 |
| SOLEF ® 6015 | PVDF homopolymer |  | 0.2 |  | 1.92 |

-continued

| Type | | MFI at 230° C. (g/10 min) | | | Intrinsic viscosity (dl/g) |
|---|---|---|---|---|---|
| | | 10 kg | 5 kg | 2.16 kg | |
| SOLEF® 6018 | PVDF homopolymer | | | | 1.99 |
| SOLEF® 6020 | PVDF homopolymer | | | | 2.14 |
| SOLEF® 31508 | VF2/CTFE copolymer | 15 | | | 1.00 |
| SOLEF® 31515 | VF2/CTFE copolymer | | | | 1.93 |
| SOLEF® 21216 | VF2/HFP copolymer | | | | 2.3 |
| SOLEF® 11008 | VF2/HFP copolymer | 24 | | | 0.92 |

Examples 1R, 2, 3R, 4, 5

The composition of Comparative Example 1R was produced by blending the VF2/CTFE thermoplastic copolymer SOLEF® 31515 with the PVDF homopolymer SOLEF® 6012 in 1/2 copolymer/homopolymer respective weight proportions, and also 0.1% by weight of calcium carbonate SOCAL® 312, relative to the total weight of (A) and (B).

The composition of Example 2 according to the invention was prepared by adding DBS, in an amount of 2.5% by weight relative to the total weight of (A) and (B), to the composition of Comparative Example 1R.

The composition of Comparative Example 3R was produced by blending SOLEF® 31508 VF2/CTFE thermoplastic copolymer with SOLEF® 1015 PVDF homopolymer in respective copolymer/homopolymer weight proportions of 1/2, together with 0.1% by weight of SOCAL® 312 calcium carbonate, 0.5% by weight of ELTEX® A4090 polyethylene resin and 0.12% by weight of IRGANOX® 1076 agent relative to the total weight of (A) and (B).

The composition of Example 4 according to the invention was produced by blending SOLEF® 31508 VF2/CTFE thermoplastic copolymer with SOLEF® 6018 PVDF homopolymer in respective copolymer/homopolymer weight proportions of 1/2, together with 0.1% by weight of SOCAL® 312 calcium carbonate and 2.5% DBS by weight relative to the total weight of (A) and (B).

The composition of Example 5 was produced like the composition of Example 4, except that a 1/1 SOLEF® 6015 PVDF homopolymer/SOLEF® 6020 PVDF homopolymer blend by weight was used in place of the SOLEF® 6018 homopolymer alone.

The table below gives the $[\eta]_{blend}$, E, $E_y$, $E_b$, $T_{db}$, $\Delta w$ and $\eta$ values measured as explained above for the compositions of Examples 1 to 5.

The composition of Example 2 according to the invention was subjected to an ageing test: the ductile-brittle transition temperature was thus measured on test pieces kept beforehand for one month at 150° C. After ageing, a $T_{db}$ of −15° C. was measured.

Examples 6, 7R and 8

The composition of Example 6 according to the invention was prepared by blending SOLEF® 31515 VF2/CTFE thermoplastic copolymer, SOLEF® 21216 VF2/HFP copolymer and SOLEF® 6012 PVDF homopolymer in respective weight proportions of 1/1/3, together with 2.5% by weight of DBS relative to the total weight of (A) and (B).

The composition of Comparative Example 7R was produced in accordance with Example 6, except that the SOLEF® 6015 PVDF homopolymer was used instead of the SOLEF® 6012 homopolymer.

The composition of Example 8 according to the invention was produced in accordance with Example 7R, except that the VF2/CTFE copolymer employed was SOLEF® 31508 and the VF2/HFP copolymer employed was SOLEF® 11008.

The table below gives the $[\eta]_{blend}$, E, $E_y$, $E_b$, $T_{db}$, $\Delta w$ and $\eta$ values as explained above for the compositions of Examples 6 to 8.

| | $[\eta]_{blend}$ (dl/g) | $T_{db}$ (° C.) | $\eta$ (kPa·s) | $E_y$ (%) | $E_b$ (%) | E (MPa) | $\Delta w$ (%) |
|---|---|---|---|---|---|---|---|
| 6 | 1.69 | −20 | 46.42 | 7.4 | 29.3 | 2361 | 2.5 |
| 7R | 2.00 | −30 | 110 | 7.6 | 12.6 | 1788 | n.d. |
| 8 | 1.54 | −15 | 30.68 | 7 | 29.8 | 2327 | 2.5 |

The compositions of Examples 6 and 8 according to the invention were subjected to an ageing test: the ductile-brittle transition temperature was thus measured on test pieces kept beforehand for one month at 150° C. After ageing, a $T_{db}$ of −10° C. was measured for the composition of Example 6 and a $T_{db}$ of 3° C. for the composition of Example 8.

Examples 9 and 10R

The composition of Example 9 according to the invention was prepared by blending SOLEF® 21216 VF2/HFP thermoplastic copolymer with SOLEF® 6012 PVDF homopolymer in respective weight proportions of 1/1.5, together with 2.5% by weight of DBS, relative to the total weight of (A) and (B).

The composition of Comparative Example 10R was prepared in accordance with Example 9, except that the SOLEF® 6015 PVDF homopolymer was used in place of the SOLEF® 6012 homopolymer.

The table below gives the $[\eta]_{blend}$, E, $E_y$, $E_b$, $T_{db}$, $\Delta w$ and $\eta$ values measured as explained above for the compositions of Examples 9 and 10R.

| Blend | $[\eta]_{blend}$ (dl/g) | DBS (% wt) | $T_{db}$ (° C.) | $\eta$ (kPa·s) | $E_y$ (%) | $E_b$ (%) | E (MPa) | $\Delta w$ (%) |
|---|---|---|---|---|---|---|---|---|
| 1R | 1.58 | — | +5 | 37.77 | 8.3 | 12.2 | 2575 | n.d. |
| 2 | 1.58 | 2.5 | −20 | 46.2 | 7 | 35.5 | 2086 | 2.5 |
| 3R | 1.47 | — | +5 | 32.2 | n.d. | n.d. | n.d. | n.d. |
| 4 | 1.64 | 2.5 | −15 | 44.5 | n.d. | n.d. | n.d. | 2.5 |
| 5 | 1.69 | 2.5 | −25 | 49.2 | 7.3 | 51.6 | 1982 | 2.5 | n.d. = not determined.

| | $[\eta]_{blend}$ (dl/g) | $T_{db}$ (° C.) | $\eta$ (kPa · s) | $E_y$ (%) | $E_b$ (%) | E (MPa) | $\Delta w$ (%) |
|---|---|---|---|---|---|---|---|
| 9 | 1.77 | −15 | 50 | 9.6 | 20.9 | 2307 | 2.5 |
| 10R | 2.07 | −20 | 105 | 7.8 | 8.2 | 1863 | n.d. |

The composition of Example 9 according to the invention was subjected to an ageing test: the ductile-brittle transition temperature was thus measured on test pieces kept beforehand for one month at 150° C. After ageing, a $T_{db}$ of less than 5° C. was measured.

Examples 11 to 13

The composition of Example 11 according to the invention was prepared in accordance with Comparative Example 1R, that is to say by blending SOLEF® 31515 VF2/CTFE thermoplastic copolymer with SOLEF® 6012 PVDF homopolymer in respective weight proportions of 1/2, together with 0.1% by weight of SOCAL® 312 calcium carbonate, relative to the total weight of (A) and (B), except that HOSTAFLON® TF9201 PTFE was added in an amount of 1% by weight relative to the total weight of (A) and (B).

The composition of Example 12 according to the invention was prepared by blending SOLAF® 31508 VF2/CTFE thermoplastic copolymer with SOLEF® 6015 PVDF homopolymer in respective weight proportions of 1/2, together with 0.1% by weight of SOCAL® 312 calcium carbonate and 0.5% by weight of HOSTAFLON® TF9201 PTFE relative to the total weight of (A) and (B).

The composition of Example 13 according to the invention was prepared by blending SOLEF® 31508 VF2/CTFE thermoplastic copolymer, SOLEF® 6012 PVDF homopolymer and SOLEF® 6020 PVDF homopolymer in respective weight proportions of 1/1/1, together with 0.1% by weight of SOCAL® 312 calcium carbonate and 0.5% by weight of HOSTAFLON® TF9201 PTFE, relative to the total weight of (A) and (B).

The table below gives the $[\eta]_{blend}$, E, $E_y$, $E_b$, $T_{db}$, $\Delta w$ and $\eta$ values measured as explained above for the compositions of Example 1R and also of Examples 11 to 13.

| | $[\eta]_{blend}$ (dl/g) | $T_{db}$ (° C.) | $\eta$ (kPa · s) | $E_y$ (%) | $E_b$ (%) | E (MPa) | $\Delta w$ (%) |
|---|---|---|---|---|---|---|---|
| 1R | 1.58 | +5 | 37.77 | 8.3 | 12.2 | 2575 | n.d. |
| 11 | 1.58 | −5 | 37.34 | 9.2 | 18.4 | 2155 | <1 |
| 12 | 1.62 | 0 | 33.58 | 9.3 | 22.8 | 2460 | <1 |
| 13 | 1.52 | −5 | 59.73 | 8.4 | 15.9 | 2814 | <1 |

Examples 14R and 15

The composition of Comparative Example 14R was prepared by blending SOLEF® 31515 VF2/CTFE thermoplastic copolymer with SOLEF® 6015 PVDF homopolymer in respective weight proportions of 1/2, together with 0.1% by weight of SOCAL® 312 calcium carbonate, relative to the total weight of (A) and (B).

The composition of Example 15 was prepared in accordance with Example 14R, except that the blend of SOLEF® 6015 PVDF homopolymer and SOLEF® 6003 low-molecular-weight PVDF homopolymer in respective weight proportions of 2.35/1 was used in place of the SOLEF® 6015 PVDF homopolymer alone.

The table below gives the $[\eta]_{blend}$, $T_{db}$, $\Delta w$ and $\eta$ values measured as explained above for the compositions of Examples 14R and 15.

| | $[\eta]_{blend}$ (dl/g) | $T_{db}$ (° C.) | $\eta$ (kPa · s) | $\Delta w$ (%) |
|---|---|---|---|---|
| 14R | 1.92 | −10 | 134.37 | n.d. |
| 15 | 1.92 | −5 | 53.9 | <1 |

The invention claimed is:

1. A polymeric composition based on a polyvinylidene fluoride homopolymer and a thermoplastic fluorocopolymer, said composition possessing an apparent melt viscosity not exceeding 60 000 Pa·s at a shear rate of 1 s$^{-1}$, a ductile-brittle transition temperature below +5° C. and a weight loss in air at 150° C. of 5% or less, said composition comprising:
   (A) 45-80% by weight relative to the total weight of (A) and (B) of at least one polyvinylidene fluoride homopolymer having an intrinsic viscosity of at least 1.20 and not greater than 2.30 dl/g;
   (B) 20-55% by weight relative to the total weight of (A) and (B) of at least one thermoplastic copolymer of vinylidene fluoride and at least one other fluoromonomer, said thermoplastic copolymer having an intrinsic viscosity of from 0.92 to 2.3 dl/g; and
   (C) 1-35% by weight relative to the total weight of (A) and (B) of at least one low-molecular-weight vinylidene fluoride polymer having an intrinsic viscosity $\eta$ not exceeding 0.8 dl/g,
   the blend of (A) and (B), in the absence of (C), possessing an average intrinsic viscosity $\eta_{blend}$ of from 1.20 dl/g or higher to less than 2.0 dl/g.

2. The composition according to claim 1, further comprising 0.05 to 10% by weight of a perfluorinated polymer relative to the total weight of (A) and (B).

3. A pipe comprising at least one layer comprising the composition according to claim 1.

4. A fashioned article formed completely or partly from a composition according to claim 1.

5. The composition according to claim 1, wherein the blend of (A) and (B), in the absence of (C), possessing an average intrinsic viscosity $\eta_{blend}$ of from 1.3 dl/g or higher to less than 2.0 dl/g.

6. The composition according to claim 1, wherein the blend of (A) and (B), in the absence of (C), possessing an average intrinsic viscosity $\eta_{blend}$ of from 1.4 dl/g or higher to less than 2.0 dl/g.

7. The composition according to claim 1, wherein the blend of (A) and (B), in the absence of (C), possessing an average intrinsic viscosity $\eta_{blend}$ of from 1.20 dl/g or higher to less than 1.95 dl/g.

8. The composition according to claim 1, wherein the blend of (A) and (B), in the absence of (C), possessing an average intrinsic viscosity $\eta_{blend}$ of from 1.3 dl/g or higher to less than 1.95 dl/g.

9. The composition according to claim 1, wherein the blend of (A) and (B), in the absence of (C), possessing an average intrinsic viscosity $\eta_{blend}$ of from 1.4 dl/g or higher to less than 1.95 dl/g.

10. The composition according to claim 1, further comprising a perfluorinated polymer.

11. A polymeric composition according to claim 1, said composition possessing an apparent melt viscosity not exceeding 18,000-55,000 Pa·s at a shear rate of 1 s$^{-1}$, a ductile-brittle transition temperature of −40° C. or higher, and a weight loss in air at 150° C. of 4% or less.

12. A polymeric composition according to claim 1, said composition possessing an apparent melt viscosity not exceeding 20,000-50,000 Pa·s at a shear rate of 1 s$^{-1}$, a ductile-brittle transition temperature of −30° C. or higher, and a weight loss in air at 150° C. of 3% or less.

13. The composition according to claim 1, further comprising dibutyl sebacate.

14. The composition according to claim 1, wherein the low-molecular-weight vinylidene fluoride has a molecular weight of 1,500-5,000.

15. The composition according to claim 1, comprising the low-molecular-weight vinylidene fluoride in an amount of 2 to 3% by weight relative to the total weight of (A) and (B).

16. The composition according to claim 1, comprising the low-molecular-weight vinylidene fluoride in an amount of 2 to less than 5% by weight relative to the total weight of (A) and (B).

17. The composition according to claim 1, comprising the low-molecular-weight vinylidene fluoride in an amount of from 1 to 3% by weight relative to the total weight of (A) and (B).

18. The composition according to claim 1, further comprising a polymeric polyester including polymerized units of sebacic acid.

19. A pipe made from the polymeric composition of claim 1.

20. The pipe of claim 19, wherein the pipe contains one or more hot hydrocarbons, and wherein the pipe is pressurized with the hot hydrocarbons.

21. The pipe of claim 20, wherein component (C) is not extracted by the hot hydrocarbons.

22. The composition according to claim 1, further comprising a polymeric polyester in an amount of 4.5% by weight or less relative to the total weight of (A) and (B).

23. The composition according to claim 1, further comprising a polymeric polyester in an amount of 4% by weight or less relative to the total weight of (A) and (B).

24. The composition according to claim 1, further comprising a polymeric polyester in an amount of 3% by weight or less relative to the total weight of (A) and (B).

25. The composition according to claim 1, wherein the intrinsic viscosity of (A) is at least 1.40 dl/g and not greater than 2.20 dl/g.

26. The composition according to claim 1, wherein the thermoplastic copolymer of vinylidene fluoride has an MFI at 230° C. and 5 kg of from 15 to 24 g/10 min.

27. The polymeric composition according to claim 1, wherein the thermoplastic copolymer of vinylidene fluoride comprises co-polymerized units of hexafluoropropylene.

28. The polymeric composition according to claim 1, wherein the thermoplastic copolymer of vinylidene fluoride comprises co-polymerized units of chlorotrifluoroethylene.

29. The polymeric composition according to claim 1, wherein the thermoplastic copolymer of vinylidene fluoride comprises co-polymerized units of trifluoroethylene.

30. The polymeric composition according to claim 1, wherein the thermoplastic copolymer of vinylidene fluoride has an intrinsic viscosity of from 0.92 to 1.00 dL/g.

31. A polymeric composition based on a polyvinylidene fluoride homopolymer and a thermoplastic fluorocopolymer, said composition possessing an apparent melt viscosity not exceeding 60 000 Pa·s at a shear rate of 1 s$^{-1}$, a ductile-brittle transition temperature below +5° C. and a weight loss in air at 150° C. of 5% or less, said composition comprising:
(A) 45-80% by weight relative to the total weight of (A) and (B) of at least one polyvinylidene fluoride homopolymer having an intrinsic viscosity of at least 1.20 and not greater than 2.30 dl/g;
(B) 20-55% by weight relative to the total weight of (A) and (B) of at least one thermoplastic copolymer of vinylidene fluoride and at least one other fluoromonomer, said thermoplastic copolymer having an intrinsic viscosity of from 0.92 to 2.3 dl/g; and
(C) a low-molecular-weight vinylidene fluoride polymer.

* * * * *

UNITED STATES PATENT AND TRADEMARK OFFICE
CERTIFICATE OF CORRECTION

| | | |
|---|---|---|
| PATENT NO. | : 8,609,756 B2 | Page 1 of 1 |
| APPLICATION NO. | : 11/577597 | |
| DATED | : December 17, 2013 | |
| INVENTOR(S) | : Thierry Baert et al. | |

It is certified that error appears in the above-identified patent and that said Letters Patent is hereby corrected as shown below:

Title Page Item (57), Lines 2-3, After "a thermoplastic fluorocopolymer" delete "Polymeric composition based on a PVDF homopolymer and a thermoplastic fluoropolymer"

Signed and Sealed this
First Day of July, 2014

Michelle K. Lee
*Deputy Director of the United States Patent and Trademark Office*